United States Patent
H et al.

(10) Patent No.: US 9,384,458 B2
(45) Date of Patent: Jul. 5, 2016

(54) AUTO CONFIGURATION OF REFRIGERATION SYSTEMS IN COLD CHAIN

(75) Inventors: Surendra H, Karnataka (IN); Dennis G. Gipson, Chesterfield, MO (US); Michael J. Higgins, St. Charles, MO (US)

(73) Assignee: THERMO KING CORPORATION, Minneapolis, MN (US)

( * ) Notice: Subject to any disclaimer, the term of this patent is extended or adjusted under 35 U.S.C. 154(b) by 290 days.

(21) Appl. No.: 13/272,914

(22) Filed: Oct. 13, 2011

(65) Prior Publication Data

US 2013/0091873 A1     Apr. 18, 2013

(51) Int. Cl.
*G06Q 10/08*     (2012.01)
*F25D 17/06*     (2006.01)
*F25D 29/00*     (2006.01)

(52) U.S. Cl.
CPC .......... *G06Q 10/0832* (2013.01); *F25D 17/065* (2013.01); *F25D 29/008* (2013.01)

(58) Field of Classification Search
CPC ............................... G06Q 10/08; G06Q 10/087
USPC .................................. 705/28; 62/89, 125–126
See application file for complete search history.

(56) References Cited

U.S. PATENT DOCUMENTS

| | | | | |
|---|---|---|---|---|
| 4,646,528 A * | 3/1987 | Marcade | ................. | F25D 29/00 236/94 |
| 5,355,686 A * | 10/1994 | Weiss | .................... | F25D 17/065 62/158 |
| 5,799,496 A * | 9/1998 | Park | ...................... | F25D 17/065 62/186 |
| 6,389,822 B1 * | 5/2002 | Schanin | .................. | F25D 29/00 221/150 R |
| 6,883,710 B2 | 4/2005 | Chung | | |
| 7,258,276 B2 | 8/2007 | Linton et al. | | |
| 7,293,705 B2 | 11/2007 | Linton et al. | | |
| 7,484,662 B2 | 2/2009 | Schmidtberg et al. | | |
| 7,591,421 B2 | 9/2009 | Linton et al. | | |
| 7,621,139 B2 | 11/2009 | Ha et al. | | |
| 2006/0150662 A1 | 7/2006 | Lee et al. | | |
| 2008/0047282 A1 * | 2/2008 | Bodin et al. | .................... | 62/129 |
| 2012/0210677 A1 * | 8/2012 | Proskin | ........................... | 53/440 |

FOREIGN PATENT DOCUMENTS

EP          1564513 A1 *   8/2005

* cited by examiner

*Primary Examiner* — Ryan Zeender
*Assistant Examiner* — Milena Racic
(74) *Attorney, Agent, or Firm* — Hamre, Schumann, Mueller & Larson, P.C.

(57) ABSTRACT

An environmentally-controlled structure for a cold chain. The structure includes a sensor, an identification reader, an environment implementer, and a controller. The sensor senses a parameter indicative of an environmental condition in the environmentally-controlled structure. The identification reader is positioned relative to the environmentally-controlled structure and reads information about the goods from an identification device associated with the goods. The environment implementer modifies the environmental condition inside the environmentally-controlled structure. The controller receives the indication of the environmental condition inside the environmental control structure from the sensor, receives the information about the goods from the identification reader, and controls the environment implementer to maintain a desired environment inside the environmentally-controlled structure based on the information about the goods and the indication of the environmental condition.

20 Claims, 3 Drawing Sheets

AUTO CONFIGURATION OF REFRIGERATION SYSTEMS IN COLD CHAIN

BACKGROUND

The invention relates to the transportation of goods that are kept in climate controlled environments.

As refrigerated goods move through the transportation chain, each link in the chain must be configured to provide the proper environment for the goods. This requires an operator at each link to determine the proper environment and to program the storage area appropriately.

SUMMARY

In one embodiment, the invention provides an environmentally-controlled structure for storing good in a cold chain. The structure includes a sensor, an identification reader, an environment implementer, and a controller. The sensor senses a parameter indicative of an environmental condition in the environmentally-controlled structure. The identification reader is positioned relative to the environmentally-controlled structure and reads information about the goods from an identification device associated with the goods. The environment implementer modifies the environmental condition inside the environmentally-controlled structure. The controller receives the indication of the environmental condition inside the environmental control structure from the sensor, receives the information about the goods from the identification reader, and controls the environment implementer to maintain a desired environment inside the environmentally-controlled structure based on the information about the goods and the indication of the environmental condition.

In another embodiment, the invention provides an environmentally-controlled transportation and storage system. The system includes a plurality of identification elements and a plurality of environmentally-controlled containers. The identification elements are associated with particular goods in the system. Each of the plurality of environmentally-controlled containers includes an identification reader, a controller, and an environment implementation system. The identification reader is configured to read the plurality of identification elements. The controller is configured to receive information from the identification reader related to the identification element read by the identification reader and to determine the optimum environment for the environmentally-controlled container based on the information. The environment implementation system is configured to receive an indication of a desired environment for the container and to maintain the desired environment in the container.

In another embodiment, the invention provides a system for controlling an environment of an environmentally-controlled transportation or storage container. The system includes an identification reader, a controller, and an environment implementation system. The identification reader reads information related to the good from a plurality of identification elements, each identification element associated with a good to be stored in environmentally-controlled transportation or storage container. The controller receives the information from the identification reader and determines the optimum environment for the environmentally-controlled transportation or storage container based on the information. The environment implementation system receives an indication of a desired environment for the environmentally-controlled transportation or storage container and maintains the desired environment in the environmentally-controlled transportation or storage container. The environmentally-controlled transportation or storage container is part of a cold chain including a plurality of environmentally-controlled transportation or storage containers, each environmentally-controlled transportation or storage container including a system for controlling the environment of the environmentally-controlled transportation or storage containers.

In another embodiment, the invention provides a method of transporting and storing goods requiring environmentally-controlled conditions. The method includes providing an identification element with information related to an environment for storing a good, linking the identification element with the good, reading the identification element when the good enters an environmentally-controlled container, determining an optimum environment for the good based on the information read from the identification element, and controlling an environment of the container based on the optimum environment.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Many goods require climate controlled environments to preserve the goods (e.g., to prevent spoilage). Table 1 below shows typical storage temperatures for various goods.

TABLE 1

| Typical Storage Temperatures | |
|---|---|
| Product | Temperature |
| Ice Cream, Frozen Bakery | $-25°$ F. to $-10°$ F. |
| Frozen Foods | $-15°$ F. to $0°$ F. |
| Meats, Seafood | $20°$ F. to $30°$ F. |
| Dairy, Produce, Juice | $25°$ F. to $40°$ F. |
| Produce, Flowers | $45°$ F. to $60°$ F. |

Figure 1:
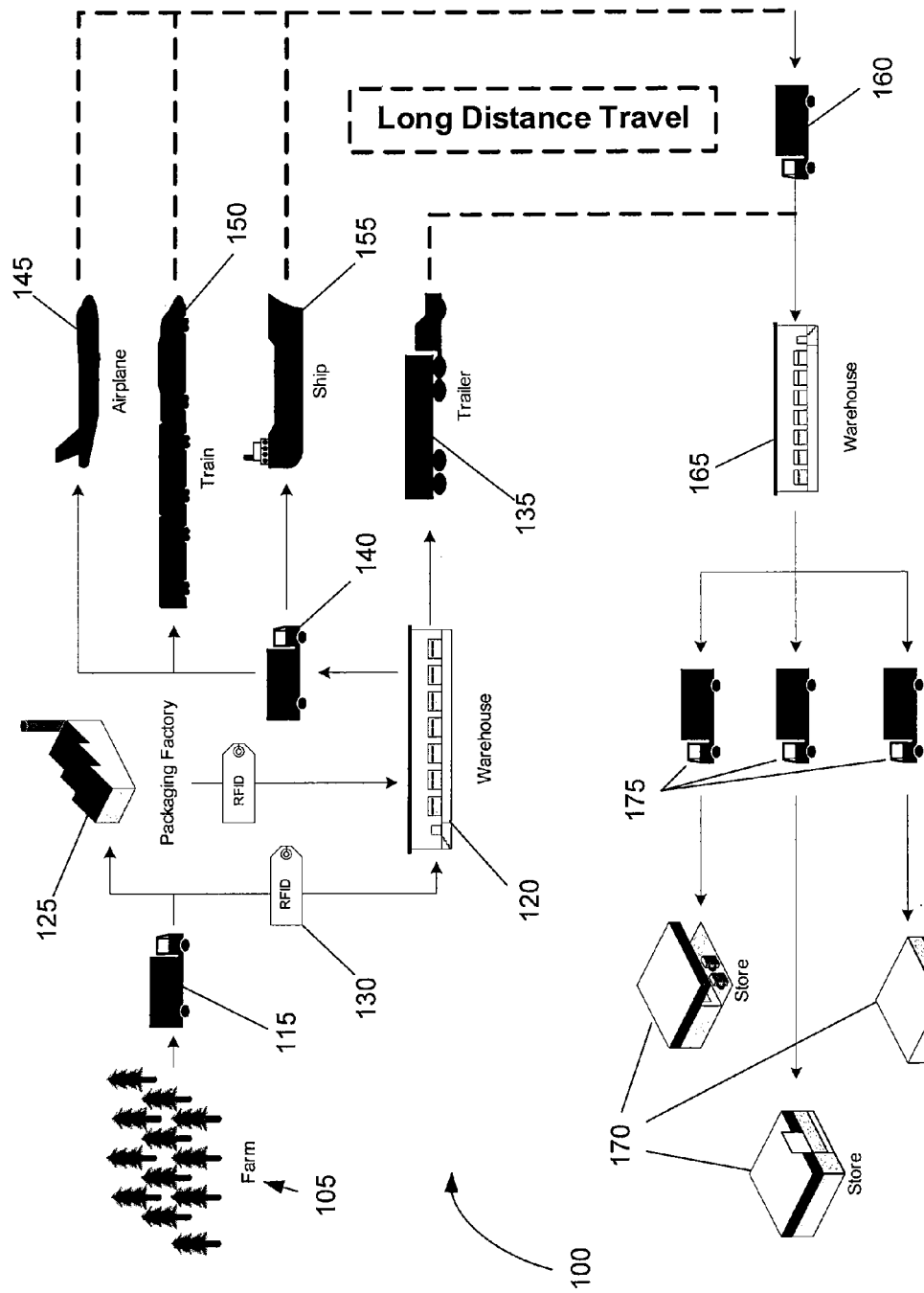
FIG. 1 is a diagram of a cold chain.

In addition, some goods require levels of humidity or other environmental factors to be maintained at certain levels. These goods typically need to have their environments controlled from the time they are created until they are used (e.g., from harvesting to consumption). FIG. 1 shows a typical cold chain 100 for an exemplary good. A good (e.g., a food product such as eggs) is harvested on a farm 105. The farm 105 can include a refrigerated storage area where the good is moved after harvesting (e.g., for sorting, packaging etc.). Later, the good is moved to a refrigerated truck 115 for transportation to another facility, generally geographically near the farm 105, such as a warehouse 120 or a factory 125. Goods that are sent to the factory 125 will generally be sent to the warehouse 120 after being processed at the factory 125. The warehouse 120 can be integrated with the factory 125 or separate (requiring transportation once again). The goods are provided with an identification element 130 (e.g., a radio frequency identification "RFID" tag) at the farm 105, when loaded on or unloaded from the truck 115, at the warehouse 120, or at the factory 125. In some constructions, the identification element 130 can be coupled to the good and/or modified at different points in the cold chain 100.

From the warehouse 120, the goods are transported to a remote location via a tractor trailer 135, or by a first truck 140 to a plane 145, a train 150, or a boat 155. A second truck 160 retrieves the goods at the remote location from the plane 145, the train 150, or the boat 155 and transports the goods to a second warehouse 165. From the second warehouse 165, the goods are transported to a store 170 via a third truck 175.

Throughout the entire cold chain 100, each container—the trucks 115, 135, 140, 160, and 175, the plane 145, the train 150, the boat 155, the warehouse 120, 130, and 165, the factory 125, and the store 170—must provide the proper environment for the goods. The goods that each container receives can change on a regular basis (e.g., daily, seasonally, etc.), requiring that the containers constantly be reprogrammed to the correct environmental factors for the goods they are presently holding. If an error occurs, and a container is not programmed, or is programmed incorrectly, the goods can be damaged (e.g., spoiled or improperly frozen).

Figure 2:
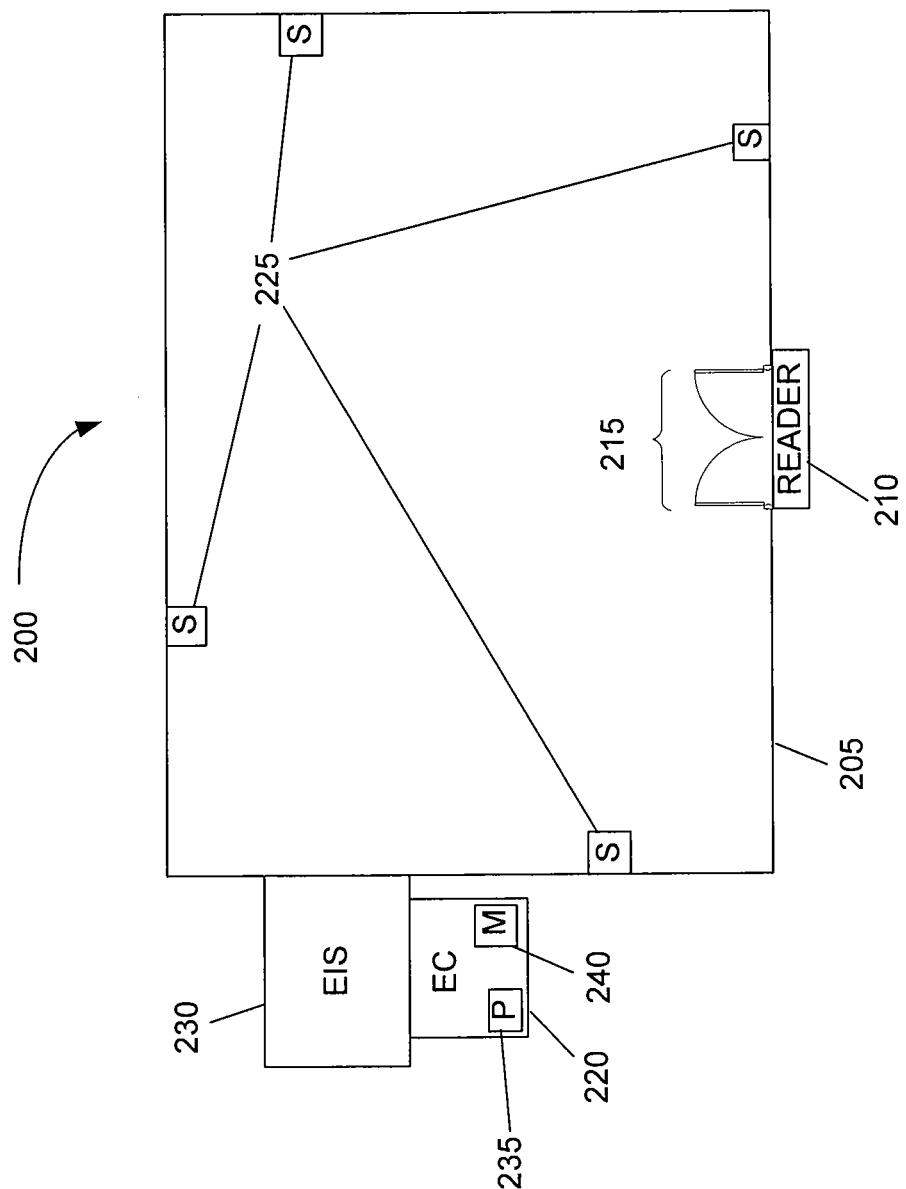
FIG. 2 is a diagram of a construction of an environmentally-controlled structure.

FIG. 2 shows a construction of an environmentally-controlled environment 200. The environment 200 includes an environment containment structure 205 (e.g., a walk-in cooler, a refrigerated merchandiser, a marine container, another container, a warehouse, a refrigerated truck, etc.), an identification reader 210 (e.g., an RFID tag reader, a bar code scanner, etc.) positioned by an entranceway 215 (e.g., a door, a gate, an insulated barrier, etc.) of the structure 205, an environment controller (EC) 220, one or more sensors 225, and an environment implementation system (EIS) 230 (e.g., a refrigeration unit, a humidor, a heater, etc.). As goods enter the environment containment structure 205, the identification reader 210 reads the identification element 130 (e.g., an RFID tag, a bar code, etc.) provided with the goods. The identification reader 210 provides information obtained from the identification element 130 to the environment controller 220. In some constructions, the information is provided to a computing device, which in turns provides information to the environment controller 220 indicating how to control the environment in the environment containment structure 205.

The controller 220 includes a processor 235 (e.g., a microprocessor, microcontroller, ASIC, DSP, etc.) and memory 240 (e.g., flash, ROM, RAM, EEPROM, etc.), which can be internal to the processor 235, external to the processor 235, or a combination thereof. The controller 220 also includes other circuits, such as input/output circuits and communication circuits. The controller 220 provides signals to, receives signals from and/or communicates with the identification reader 210, the environment controller 220, the one or more sensors 225, and the environment implementation system 230 via wires or wirelessly.

Based on the information obtained from the identification element 130, the environment controller 220 controls the environment implementation system 230 to ensure the environment inside the environment containment structure 205 is correct for the goods entering the structure 205. If multiple goods are stored in the structure 205, the environment controller 220 determines the best environment for all of the goods combined (e.g., maintaining a temperature for the goods requiring the coldest temperature). In some constructions, multiple identification readers 210 are positioned around the structure 205. This enables one or more environment controllers 220 to control one or more environment implementation systems 230 (e.g., refrigeration units, venting, etc.) to maintain different environments within the structure 205. The different environments can be based on what goods are stored in the environmentally-controlled structure 205, and where in the environmentally-controlled structure 205 the various goods are stored.

In some constructions, the environment containment structure 205 includes multiple chambers or sections, each section providing a different environment (e.g., a trailer having a frozen section and a refrigerated section). The sections can be controlled by a single environment controller 220 and the environment of each section can be maintained by a single environment implementation system 230.

In some constructions, individual goods (e.g., a carton of ice cream) contain the identification element 130. In other constructions, groups of goods (e.g., a pallet containing multiple cartons of ice cream) contain the identification element 130. The identification element 130 includes data from which the environment controller 220 can determine how to best control the environment for the particular goods being stored. For example, the identification element 130 can include a proprietary environment identifier code that indicates to a proprietary system (e.g., a specific manufacturer's system) how to control the environment. In other constructions, an industry wide specification could be developed to create environment identifier codes which environment controllers 220 from different manufacturers would recognize. The identification element 130 can also contain actual environment information (e.g., temperature range, humidity range, etc.) for the particular goods. The identification element 130 can also include information on the type or class of goods, an owner of the goods, a serial number, etc., which the environment controller 220 can use to determine the optimum environment for the goods. The identification element 130 could also include various time/date stamps, for example indicating when produce was harvested at a farm. The environment controller 220 can determine if the goods have been in the cold chain 100 for a certain time period and could lower the temperature of the structure 205 to slow further ripening of the goods that have been in the cold chain 100 for an extended time period, thereby increasing the shelf life of the goods.

Figure 3:
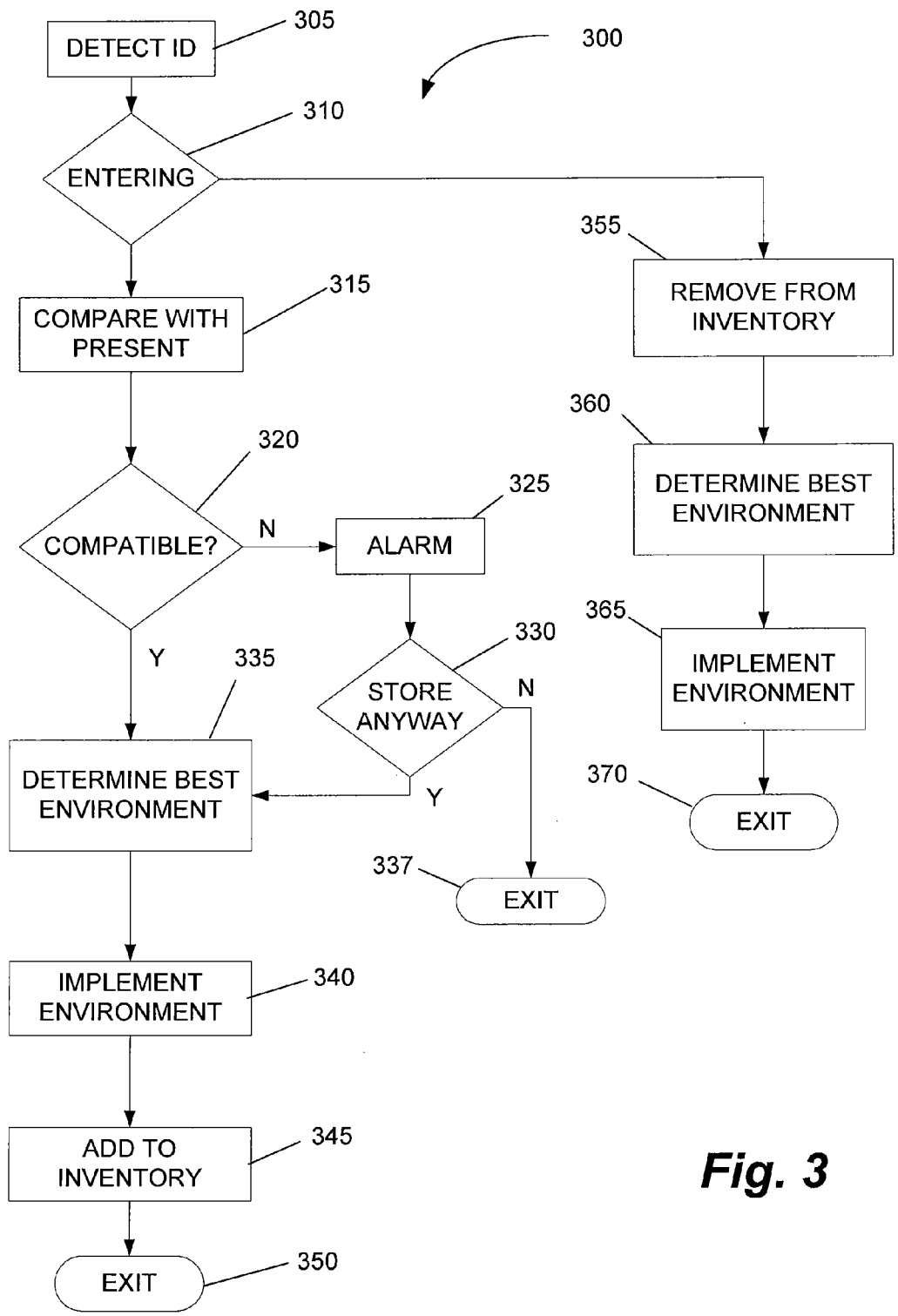
FIG. 3 is an embodiment of an operation of the environmentally-controlled structure of FIG. 2.

FIG. 3 shows an embodiment of the operation 300 of an environmentally-controlled environment 200 for goods entering and leaving the environment. The identification reader 210 detects and reads the identification element 130 of goods entering or leaving the environmentally-controlled structure 205 (step 305). The controller 220 then determines if the goods are entering or leaving the structure 205 (step 310). The controller 220 can determine whether goods are entering or leaving the structure by detecting a direction of movement of the goods or the controller 220 can request an operator input, into an operator interface, whether the goods are entering or leaving.

If the controller 220 determines the goods are entering the structure 205 (at step 310), the controller 220 compares the desired environment for the goods with the range of desired environments for goods presently stored in the structure 205 (step 315), and determines if the entering goods are compatible with goods presently in the structure 205 (step 320). If the desired environment for the new goods is not compatible (step 320) with the range of desired environments for goods presently stored in the structure 205, the controller 220 issues an alarm or warning (step 325). The alarm can be an acoustic alarm or can be shown on a display or both. The display can show information on the desired environment for the goods, and can show information on the goods presently stored in the structure 205. An operator makes a decision (step 330) to store the goods in the structure 205 in spite of the incompatibility or to move them to another structure 205. If the goods are compatible with the goods presently stored in the structure 205 (step 320) or the operator chooses to store the incompatible goods in the structure anyway (step 330), the controller 220 determines the best environment based on all of the goods now stored in the structure 205 (step 335). If the goods are the only goods being stored in the structure 205, the optimum environment is chosen. If the goods are all compatible, the controller 220 calculates the best environment for all of the goods. If the goods were not compatible (step 320), the operator may be given an opportunity to choose whether to let the controller 220 determine the best environment for all of the goods (e.g., reducing the temperature below freezing even if some of the goods should not be frozen) or to maintain the present environment and ignore the addition of the latest goods. Different algorithms can be used to determine the best environment including taking into account the quantity of the various goods stored, a value of the various goods stored, a length of time the goods are expected to be kept in the structure 205, etc. (e.g., choosing the environment for the most valuable goods). If the operator decides to not store the incompatible goods in the structure 205 (step 330), the operation is exited (step 337).

Once the environment is determined, the controller 220 directs the environment implementation system 230 to maintain the desired environment (step 340). The controller 220 also updates its inventory records to account for the goods that are now stored in the structure 205 (step 345) and exits the operation (step 350) until another identification element 130 is detected (step 305).

If the controller 220 determines the goods are leaving the structure 205 (step 310), the controller 220 updates its inventory records to remove the goods from inventory (step 355). The controller 220 then recalculates the best environment for the goods remaining in the structure 205 (step 360) and directs the environment implementation system 230 to maintain the desired environment (step 365). The controller 220 then exits the operation (step 370) until another identification element 130 is detected (step 305).

In some constructions, the identification element is powered, enabling the element to transmit the information it contains over greater distances than a passive device. In some constructions, one or more identification readers are positioned within the environmentally-controlled structure and read the identification elements after the container is sealed. The controller then determines the optimum environment and controls the environmentally-controlled structure to maintain the optimum environment.

Various features and advantages of the invention are set forth in the following claims.

What is claimed is:

1. An environmentally-controlled structure of a cold chain, the environmentally-controlled structure for storing goods including an identification device containing information about the goods, comprising:
   a sensor to sense a parameter indicative of an environmental condition in the environmentally-controlled structure;
   an identification reader positioned relative to the structure and configured to read the information about the goods;
   an environment implementer configured to modify the environmental condition inside the environmentally-controlled structure;
   a controller configured to receive the indication of the environmental condition inside the environmentally-controlled structure from the sensor, to receive the information about goods entering and leaving the environmentally-controlled structure from the identification reader, to maintain an inventory of goods in the environmentally-controlled structure, to compare an optimum environment for goods entering the environmentally-controlled structure with the optimum environment of goods already in the environmentally-controlled structure, to determine an updated optimum environment of goods in the environmentally-controlled structure based on the comparison between the optimum environment for goods entering the environmentally-controlled structure and on the optimum environment of goods already in the environmentally-controlled structure, and to control the environment implementer to adjust a desired environment inside the environmentally-controlled structure based on the updated optimum environment of goods in the environmentally-controlled structure; and
   an alarm configured to provide an indication to an operator when an optimum environment of a good entering the environmentally-controlled structure is incompatible with the optimum environments of goods already in the environmentally-controlled structure.

2. The environmentally-controlled structure of claim 1, wherein the controller determines the updated optimum environment for the environmentally-controlled structure based on the optimum environments for all of the goods in the environmentally-controlled structure.

3. The environmentally-controlled structure of claim 1, wherein when the alarm is ignored and the good is put in the environmentally-controlled structure the controller determines the updated optimum environment for the environmentally-controlled structure based on at least one of the value of the goods stored in the environmentally-controlled structure, the length of time the goods in the environmentally-controlled structure have been in the cold chain, and a quantity of the goods stored in the environmentally-controlled structure to best preserve one or more of the goods in the environmentally-controlled structure.

4. The environmentally-controlled structure of claim 1, further comprising a display, coupled to the controller.

5. The environmentally-controlled structure of claim 4, wherein the display shows data on the environment of the environmentally-controlled structure.

6. The environmentally-controlled structure of claim 4 wherein the display shows data on the goods stored in the environmentally-controlled structure.

7. The environmentally-controlled structure of claim 1, wherein the environmentally-controlled structure is at least one of a walk-in cooler, a refrigerated merchandiser, a marine container, a warehouse, a factory, a truck, a trailer, a train, a boat, and an airplane.

8. The environmentally-controlled structure of claim 1, wherein the controller is configured to determine when goods are leaving the environmentally-controlled structure, configured to update the inventory when the controller determines that goods are leaving the environmentally-controlled structure, and configured to determine the updated optimum environments of goods in the environmentally-controlled structure based on the goods remaining in the environmentally-controlled structure.

9. A system for controlling an environment of an environmentally-controlled transportation or storage container which is part of a cold chain including a plurality of environmentally-controlled transportation or storage containers, each environmentally-controlled transportation or storage container including a system for controlling the environment of the environmentally-controlled transportation or storage containers, the system comprising:
- an identification reader configured to read information from a plurality of identification elements, each identification element associated with a good to be stored in the environmentally-controlled transportation or storage container, the information associated with the good;
- a controller configured to receive the information from the identification reader, to maintain an inventory of goods in the environmentally-controlled transportation or storage container, to compare an optimum environment for goods entering the environmentally-controlled transportation or storage container with the optimum environments of goods already in the environmentally-controlled transportation or storage container, and determine an updated optimum environment of goods in the environmentally controlled transportation or storage container based on the comparison between the optimum environment for goods entering the environmentally controlled transportation or storage container and on the optimum environment of goods already in the environmentally-controlled transportation or storage container;
- an alarm providing an indication that an optimum environment for a good entering the environmentally-controlled transportation or storage container is incompatible with the optimum environments of goods already in the environmentally-controlled transportation or storage container; and
- an environment implementation system configured to receive an indication of a desired environment for the environmentally-controlled transportation or storage container and to adjust the desired environment in the environmentally-controlled transportation or storage container based on the updated optimum environment of goods in the environmentally-controlled transportation or storage container.

10. The system of claim 9, wherein the identification reader is configured to read information from radio frequency identification (RFID) tags.

11. The system of claim 9, wherein the system includes a display.

12. The system of claim 11, wherein the display shows information on the goods stored in the environmentally-controlled transportation or storage container.

13. The system of claim 9, wherein the system maintains an inventory of goods in the environmentally-controlled transportation or storage container.

14. The system of claim 9, wherein the controller is configured to determine when goods are leaving the environmentally-controlled structure, configured to update the inventory when the controller determines that goods are leaving the environmentally-controlled structure, and configured to recalculate an optimum environments of goods in the environmentally-controlled structure based on the goods remaining in the environmentally-controlled structure.

15. A method of storing goods requiring environmentally-controlled conditions in an environmentally-controlled container, the method comprising:
- providing an identification element with information related to an environment for storing a good;
- linking the identification element with the good;
- reading by a sensor the identification element when the good enters an environmentally-controlled container;
- updating an inventory of goods in the environmentally-controlled container;
- determining by a controller an optimum environment for the good based on the information read from the identification element;
- comparing the optimum environment for the good to the optimum environments of the goods already in the environmentally-controlled container;
- determining an updated optimum environment of goods in the environmentally-controlled container based on the comparison between the optimum environment for the good entering the environmentally-controlled container and on the optimum environments of the goods already in the environmentally-controlled container;
- controlling by the controller an environment of the environmentally-controlled container by adjusting a desired environment inside the environmentally-controlled container based on the updated optimum environment of goods in the environmentally-controlled container; and
- sounding an alarm when that an optimum environment for a good entering the environmentally-controlled transportation or storage container is incompatible with the optimum environments of goods already in the environmentally-controlled transportation or storage container.

16. The method of claim 15, wherein controlling the environment of the container includes accounting for the optimum environments for goods already in the container in addition to the optimum environment for the good.

17. The method of claim 15, further comprising maintaining an inventory of goods in the container.

18. The method of claim 15, further comprising providing a warning when the optimum environment of the good is incompatible with the optimum environments of goods presently in the container.

19. The method of claim 15, further comprising displaying information related to the environment being maintained in the container.

20. The method of claim 15, further comprising:
- the controller determining when goods are leaving the environmentally-controlled structure;
- the controller updating the inventory when the controller determines that goods are leaving the environmentally-controlled structure, and
- recalculating optimum environments of goods in the environmentally-controlled structure based on the goods remaining in the environmentally-controlled structure.

* * * * *